United States Patent [19]
Granata

[11] Patent Number: 5,088,753
[45] Date of Patent: Feb. 18, 1992

[54] THREE-POINT HITCH WHICH IS CONVERTIBLE TO A BALL HITCH

[76] Inventor: Clarence Granata, 4055 Bristol Valle, Canandaigua, N.Y. 14224

[21] Appl. No.: 684,195

[22] Filed: Apr. 12, 1991

[51] Int. Cl.⁵ .............................................. B60D 1/01
[52] U.S. Cl. .................................. 280/416.2; 280/511
[58] Field of Search ................... 280/416.2, 504, 511, 280/491.5

[56] References Cited

U.S. PATENT DOCUMENTS

| | | | |
|---|---|---|---|
| 2,940,775 | 6/1960 | Farrow et al. | 280/511 |
| 3,093,394 | 6/1963 | McCollum . | |
| 3,827,724 | 8/1974 | Ackley . | |
| 3,905,619 | 9/1975 | Sylvester . | |
| 4,199,167 | 4/1980 | Points . | |
| 4,214,776 | 7/1980 | Nurse | 280/416.2 |
| 4,625,989 | 12/1986 | Allen et al. . | |
| 4,729,571 | 3/1988 | Tienstra | 280/504 |

FOREIGN PATENT DOCUMENTS

| | | | |
|---|---|---|---|
| 2298449 | 8/1976 | France | 280/511 |

Primary Examiner—Robert P. Olszewski
Assistant Examiner—Steven M. Reiss
Attorney, Agent, or Firm—Marjama & Pincelli

[57] ABSTRACT

A coupling device for converting a three-point hitch to either a ball or pin type hitch. The coupling device includes a main longitudinally extending support member having a forward end and a rearward end. The forward end has a ball or pin secured thereto. The forward end is designed to be secured to the forward ends of the two side arms of a three-point hitch. The device also includes a locking member secured at the rear section of the main support member. The locking member comprising a cross support member which terminates in a pair of lateral spaced ends, which have a projection extending therefrom. Each of the projections having a hole that is in axial alignment so as to receive a first locking pin therethrough. The projections have a length such that when the device is mounted on two arms of a three-point hitch, the first locking pin passes through said aligned holes in the projections so as to capture the two arms between the cross support member and pin.

11 Claims, 5 Drawing Sheets

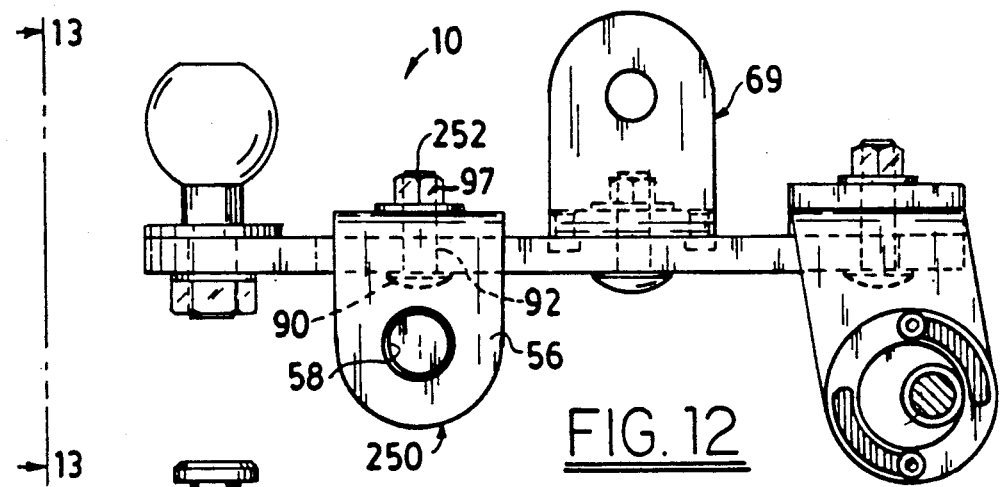
FIG. 12
FIG. 12A
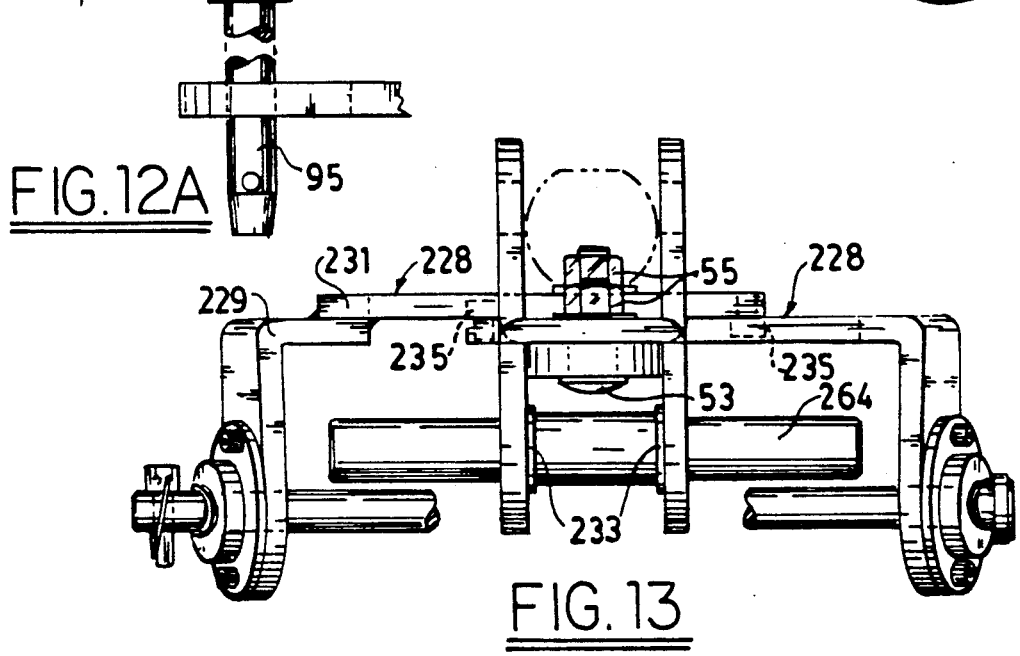
FIG. 13
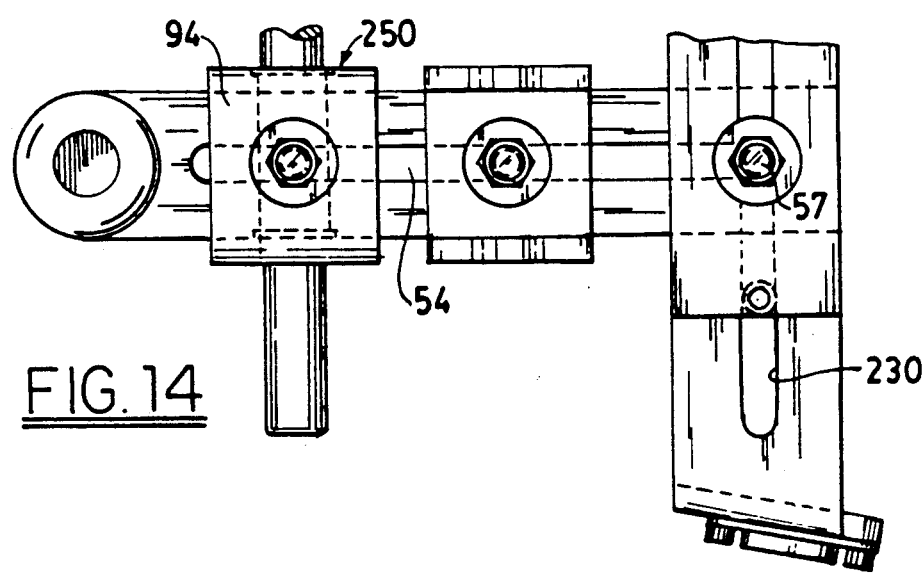
FIG. 14

THREE-POINT HITCH WHICH IS CONVERTIBLE TO A BALL HITCH

BACKGROUND OF THE INVENTION

The present invention concerns a coupling device for connecting a trailing vehicle to a three-point hitch.

Tractors and similar like farm equipment are typically provided with three-point hitches which typically comprise two side arms axially spaced apart in the same plane and a third top arm located above the two side arms substantially midway between. The arms are each pivotably connected to the tractor at one end and have an outer end designed to be connected to a variety of vehicles to be towed by the tractor. However, sometimes it is desirable to tow vehicles which have a pin or ball type hitch as opposed to the three-point hitch provided by the tractor. In many instances, a supplemental tongue is provided between the two side arms. However, due to the placement of this tongue it is difficult to properly tow the trailing vehicle due to the physical construction of the tractor and placement of the ball hitch. Various coupling devices have been suggested in the prior art which convert a three-point hitch to a typical ball or pin hitch such as illustrated in U.S. Pat. No. 3,905,619. However, such coupling devices are relatively difficult to install and relatively expensive to manufacture.

Applicants have invented a coupling device for converting a three-point hitch to either a ball or pin type hitch which is simple in construction, easy to install quickly, easy to remove, and is relatively inexpensive to manufacture.

SUMMARY OF THE INVENTION

A coupling device for converting a three-point hitch to either a ball or pin type hitch. The coupling device includes a main longitudinally extending support member having a forward end and a rearward end. The forward end has a ball or pin secured thereto. The forward end is designed to be secured to the forward ends of the two side arms of a three-point hitch. The device also includes a locking member secured at the rear section of the main support member. The locking member comprising a cross support member which terminates in a pair of lateral spaced ends, which have a projection extending therefrom. Each of the projections having a hole that is in axial alignment so as to receive a first locking pin therethrough. The projections have a length such that when the device is mounted on two arms of a three-point hitch, the first locking pin passes through said aligned holes in the projections so as to capture the two arms between the cross support member and pin.

DETAILED DESCRIPTION OF THE DRAWINGS

FIG. 12 is a side elevational view of another modified coupling device made in accordance with the present invention;

FIG. 12A is a fragmenting view of the forward end of the device of FIG. 12 illustrating an alternate connecting means;

FIG. 13 is an end side elevational view of the device of FIG. 12 as taken along line 13—13; and FIG. 14 is a top plan view of the device of FIG. 12 partially broken away.

DETAILED DESCRIPTION OF THE INVENTION

Figure 1:
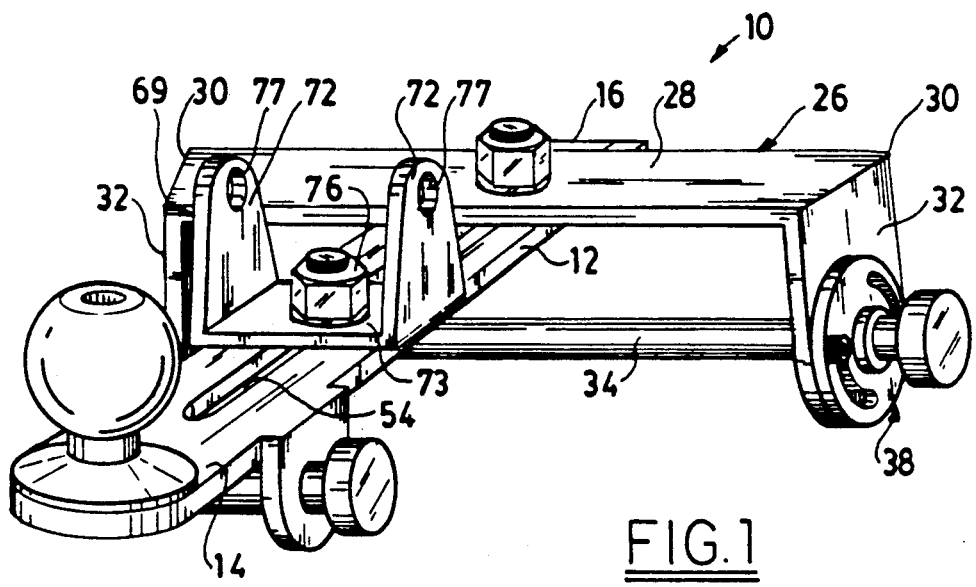
FIG. 1 illustrates a perspective view of a coupling device made in accordance with the present invention.

Referring to FIGS. 1-4, 8 and 9, there is illustrated a coupling device 10 made in according to the present invention which is designed to be connected to a three-point hitch typically found on farm tractors or similar type vehicles. The coupling device 10 comprises a main longitudinally extending support member 12 having a forward end 14 and a rearward end 16. The forward end 14 of support member 12 is provided with an opening 18 for allowing passage therethrough of a threaded shaft 20 of a hitch ball 22. In the particular embodiment illustrated the hitch ball 22 is secured to the forward end 14 through the use of a threaded nut 24 which threadedly engages the threaded shaft 20. However, it is to be understood that the hitch ball 22 may be secured to the forward end 14 of support member 12 by any desired means. A locking member 26 is secured at the rear end 16 of support member 12.

Figure 8:
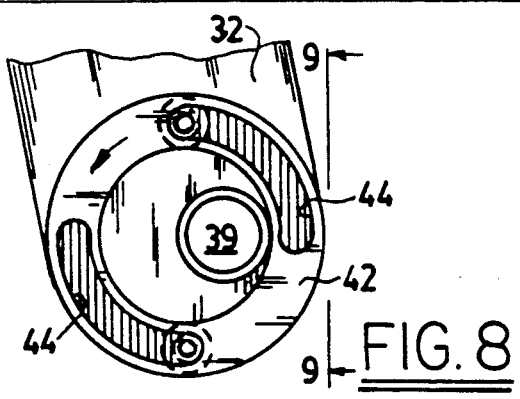
FIG. 8 is an enlarged partial side view of the end of cross support member as taken along line 8—8 of FIG. 3.
Figure 9:
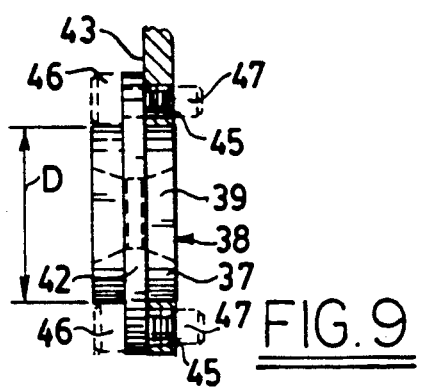
FIG. 9 is a side view of FIG. 8 as taken line 9—9 of FIG. 8 partially broken away.

The locking member 26 comprises a cross support member 28 which terminates in a pair of lateral spaced ends 30 each having a projection 32 extending downwardly therefrom. Each projection 32 is provided with means for receiving a locking pin 34. In the particular embodiment illustrated each projection 32 is provided with a generally circular opening 36 for receiving an adjustable locking disk 38 (see FIGS. 8 and 9) which has an opening 39 for receiving locking pin 34. FIGS. 8 and 9 illustrate in greater detail the adjustable locking disk 38 and how it is secured to projection 32. The adjustable locking disk 38 comprises a central cylindrical section 37 having an outer diameter D designed to fit within the opening 36 of projection 32. The central cylindrical section 37 is provided with a annular outer skirt 42 designed to abut against the outer surface 43 of the projection 32. The annular outer skirt 42 is provided with a pair of arcuate extending slots 44, each slot 44 being designed to align with a corresponding threaded opening 45 in projections 32. The adjustable locking disk 38 is secured to projection 32 by means of a threaded bolt 46 which has a threaded shank 47 which engages threaded opening 45 so as to secure the annular skirt 47 against projection 32. By loosening threaded bolt 46 the locking disk 38 may be rotated so that opening 39 in central cylindrical portion 37 will be moved either vertically upward or downward to the desired position is discussed later herein. While in the preferred embodiment, means for adjusting the location of opening 39 are provided, if so desired, adjustable locking disk 38 may be eliminated and the opening 39 for receiving locking pin 34 may be provided directly within projections 32.

The locking pin 34 comprises a head portion 48 and a shaft portion 49 extending therefrom. The head portion 48 has an outer diameter greater than the opening 39 which the shaft portion 49 is designed to pass through thereby limiting movement of locking pin 34 through openings 36. The outer end 50 of shaft portion 49 is provided with an opening 51 for receiving a locking clip 52 of the type as illustrated in FIG. 13. After the locking pin 34 has been fully seated in locking member 26 and locking clip 52 is placed through opening 51, the coupling device 10 will be secured to the three-point hitch as will be further described herein.

The cross member 28 is adjustably secured to support member 12 through the use of a bolt 53 is designed to pass through opening 52 and a corresponding elongated slot 54 in support member 12. This allows for proper fitting of the device 10 to the three-point hitch. In the particular embodiment illustrated a bolt 53 threadedly engages a nut 55. When nut 55 is tightened, this causes the cross support 28 to be secured in position with respect to the main support member 12. By loosening nut 55, the cross support member 28 may be moved longitudinally along the length of support member 12 as desired and then locked in the appropriate position so as to accommodate the axial spacing of side arms 59 of a three-point hitch. Preferably, as illustrated, the inside surfaces 61 is closely adjacent the outer surface of side arms 59.

Figure 2:
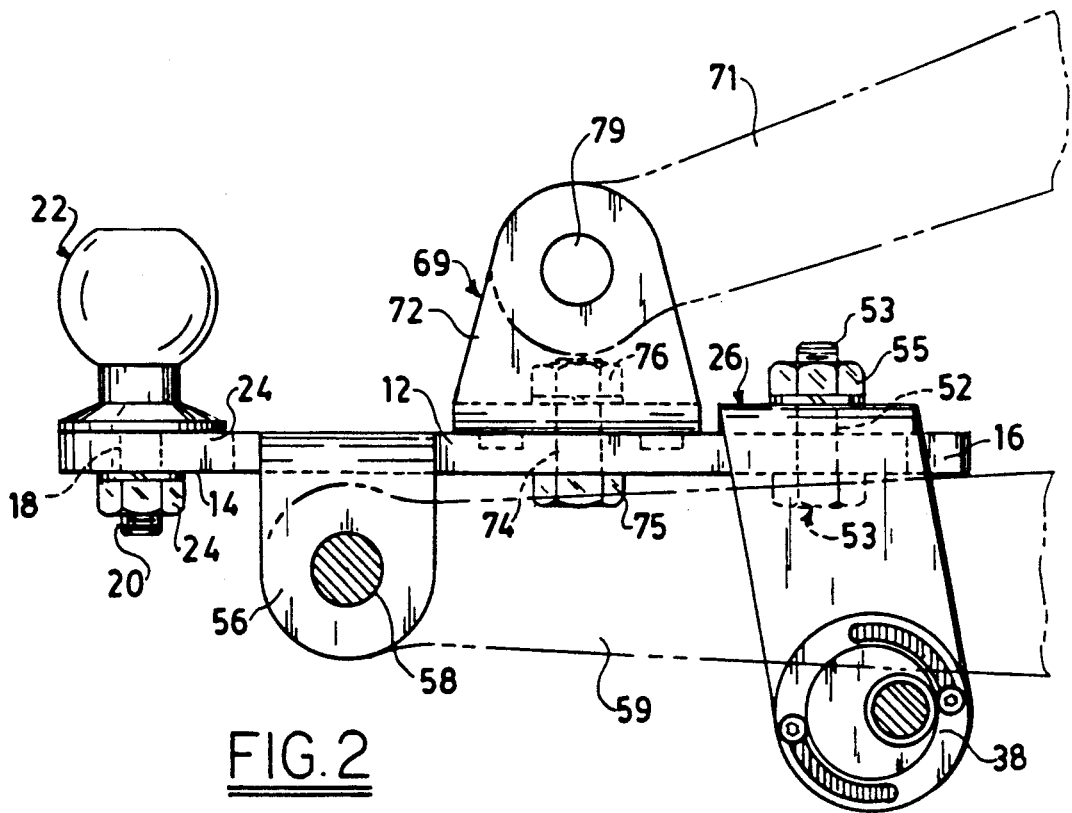
FIG. 2 is a side elevational view of the coupling device of FIG. 1 illustrating how it would be connected to the end of a three-point hitch.
Figure 3:
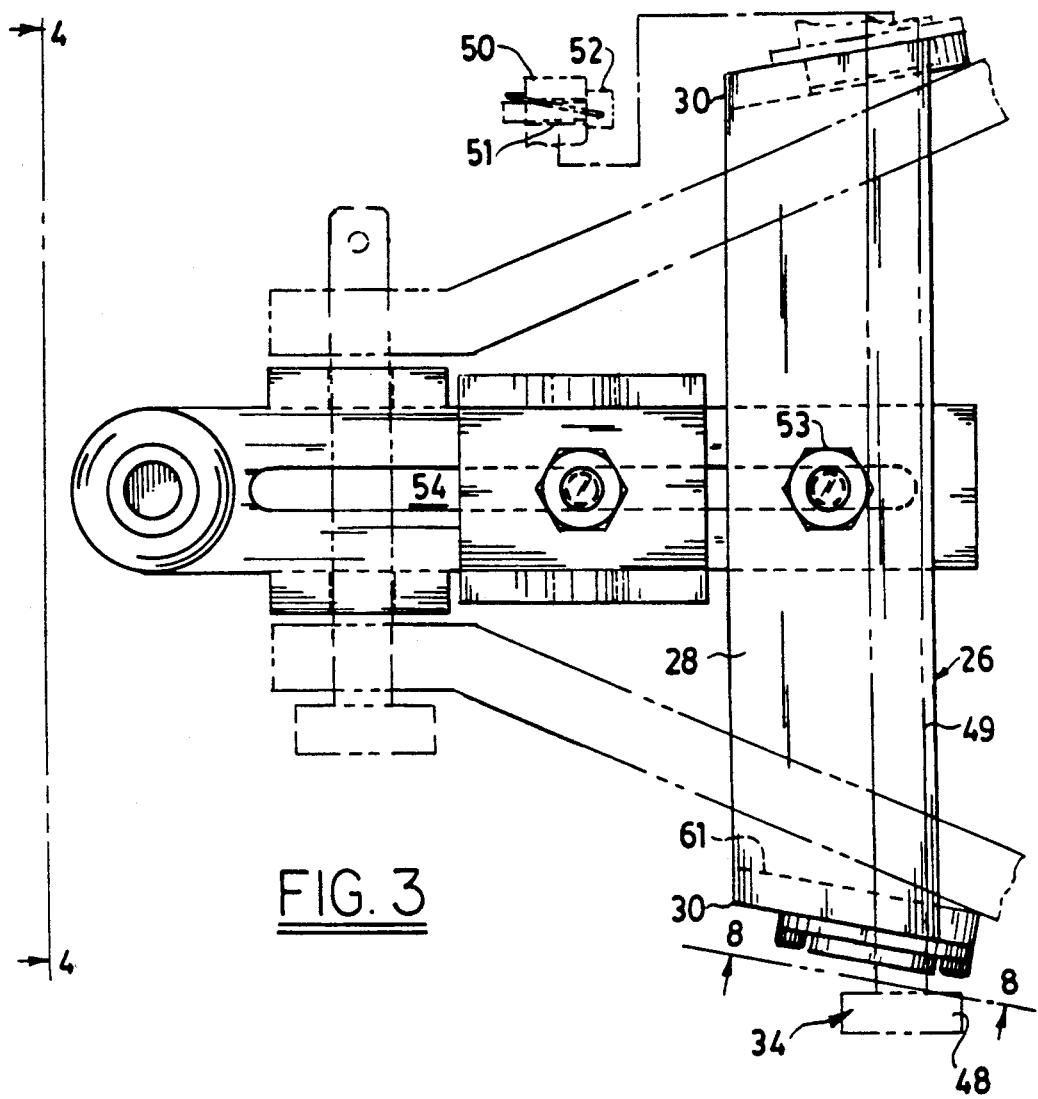
FIG. 3 is top plan view of FIG. 2.
Figure 4:
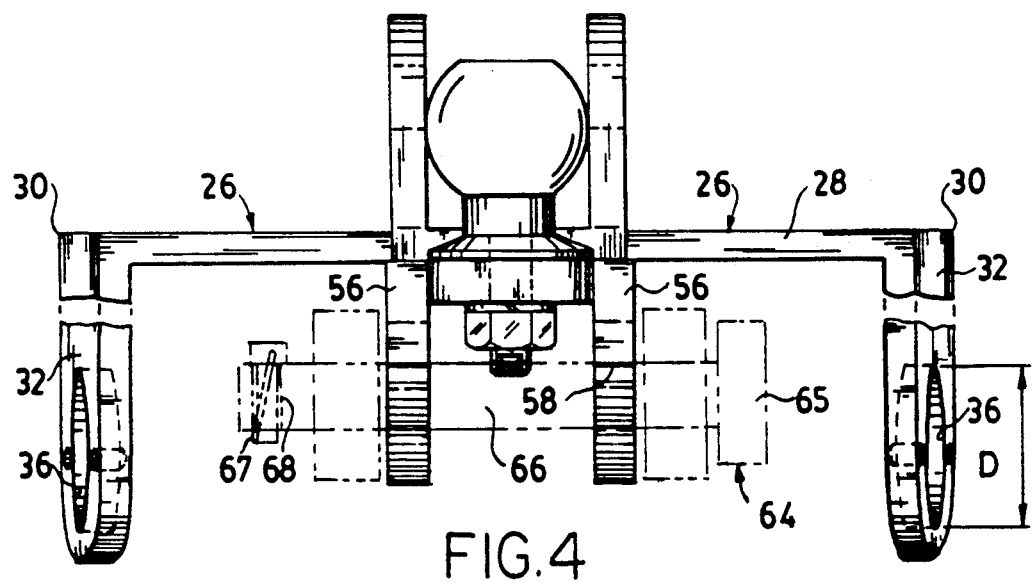
FIG. 4 is an end side elevational view of FIG. 3 as taken along line 4—4.

The forward end 14 of support member is provided with a pair of axially spaced forward projections 56 which extend downward so as to provide means for securing the forward end of the side arms 59 of a two point hitch as illustrated in FIGS. 2 and 3. The side arms 59 are illustrated by phantom lines. The projections 56 are each provided with an opening 58 designed to receive a locking pin 64 which passes through opening 59 and through the corresponding opening 62 in arms 59. Locking pin 64 is used to maintain and secure side arms 59 to projections 56. Locking pin 64 is similar to locking pin 34 and has a head portion 65 and a shaft portion 60 extending therefrom. Locking clip 67 passes through opening 68 in the outer end of shaft portions 66 so as to maintain side arms 59 in engagement with coupling device 10.

In the preferred embodiment illustrated there is provided an optional adapter 69 for securing the top arm 71 of the three-point hitch. The adapter 69 comprises a pair of upstanding projections 72 which extend from a base portion 73 having an opening 74. A threaded bolt 75 secures the adapter 66 to support member 12 by passing through elongated slot 54 in support member 12 and opening 74. A nut 76 is used to secure the adapter 69 to the support member 12. The adapter 69 may be positioned along the slot of support member 12 to accommodate the length of top arm 71 by simply loosening nut 76 and moving the adapter 76 to desired position and retightening nut 76 so as to lock the adapter 69 to support member 12. The upstanding projections 72 are each provided with axial aligned holes 77 for allowing passage of a pin 79 (see FIG. 2) therethrough which also passes through an opening in top arm 71 of the three-point hitch. The locking pin 79 is substantially identical in configuration and operation as pins 64 and 34. The pin 79 in a similar manner is provided with an opening (not shown) at its outer end for receiving a locking clip so as to secure the locking pin 79 in position when the top arm 71 is secured therethrough.

Figure 5:
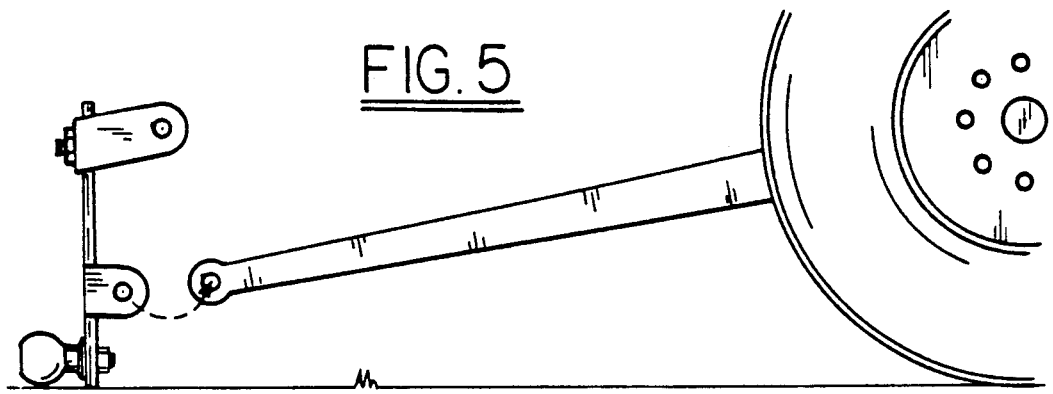
FIGS. 5, 6 and 7 illustrate in sequence the installation of the coupling device of FIG. 1 onto two side arms of a three-point hitch.
Figure 6:
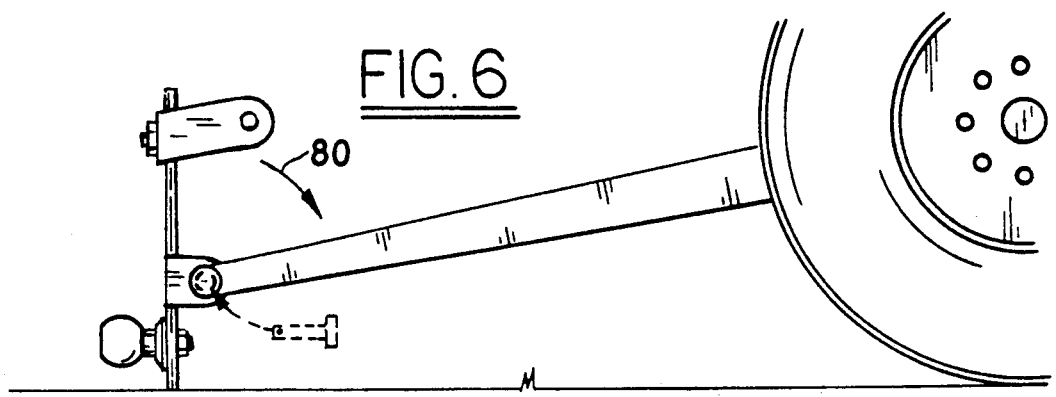
Figure 7:
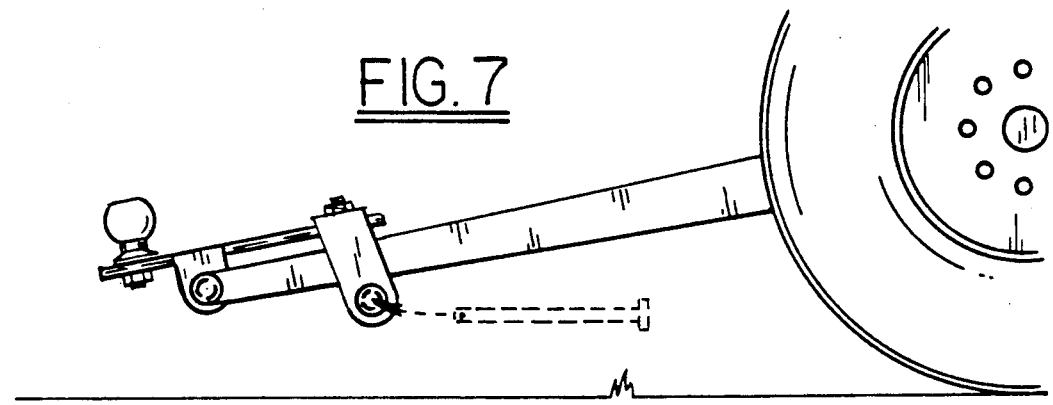

In order to more fully understand the installation, use and removal of the coupling device 10, a detailed discussion now follows. Referring to FIG. 5 there is illustrated the coupling device 10 of FIG. 1 prior to being secured to two side arms 59 of a three-point hitch. The adapter 69 has been removed as this is optional. However, it is to be understood that if the top arm 71 is to be used, the adapter 69 may be placed thereon. First, the coupling device 10 is put in a substantially vertical position as illustrated in FIG. 5. Thereafter the openings in side arms 59 are aligned with the openings 58 in projections 56. As illustrated in FIG. 5, the side arms 59 are positioned on outer side of the projections 56. The pin 64 is passed through the openings 58 of projections 56 and openings 62 of side arms 59. Thereafter locking pin 64 is placed through openings 68. Thereafter the device 10 is rotated as illustrated by arrow 80 in FIG. 6 until it reaches the position illustrated in FIG. 7. Thereafter, the pin 34 is passed through openings 39 in of projections 32 as illustrated. The openings 39 are positioned such that the pin 34 is below the bottom of arms 57 leaving only minimal clearance between the bottom of side arms 59 and pin 34. The pin 34, after it has been fully seated, is secured in position by insertion of locking clip 52. The locking pin 34 in this position captures the side arms 59 of the three-point hitch. As previously discussed, the openings 39 of projections 32 may be adjusted such that the arms 59 are firmly positioned between the cross support member 26 and locking pin 34. This may be done at this point in time or be adjusted prior to placement of the coupling device 10 on the side arms 59 of the trailer hitch. The locking member 26 is adjusted so if it has not already been done, by moving it along slot 54 so that projections 32 are closely adjacent arms 59. If desired, the third top arm 71 of the three-point hitch may be secured to adapter 66 if so provided. The positioning of adapter 66 or cross support member 26 need only be done once for a particular trailer. Thereafter, each time this device is used on the same vehicle it will automatically be prepositioned in the appropriate position. The hitch ball 22 is then used as it is in any other fashion to trail an appropriate vehicle. The device 10 is removed by simply reversing the order of steps used to install the device. The actual time required to install the coupling device is extremely short. Applicants have found that coupling device 10 can be installed or removed within a couple minutes.

It is to be understood that various modifications may be made without departing from the scope of the present invention. For example, in the preferred embodiment a hitch ball 22 is placed at the forward end 14 of the main support member 12. However, if desired, a pin 95 such as illustrated in FIG. 12a may be used to pull the desired vehicle.

Figure 10:
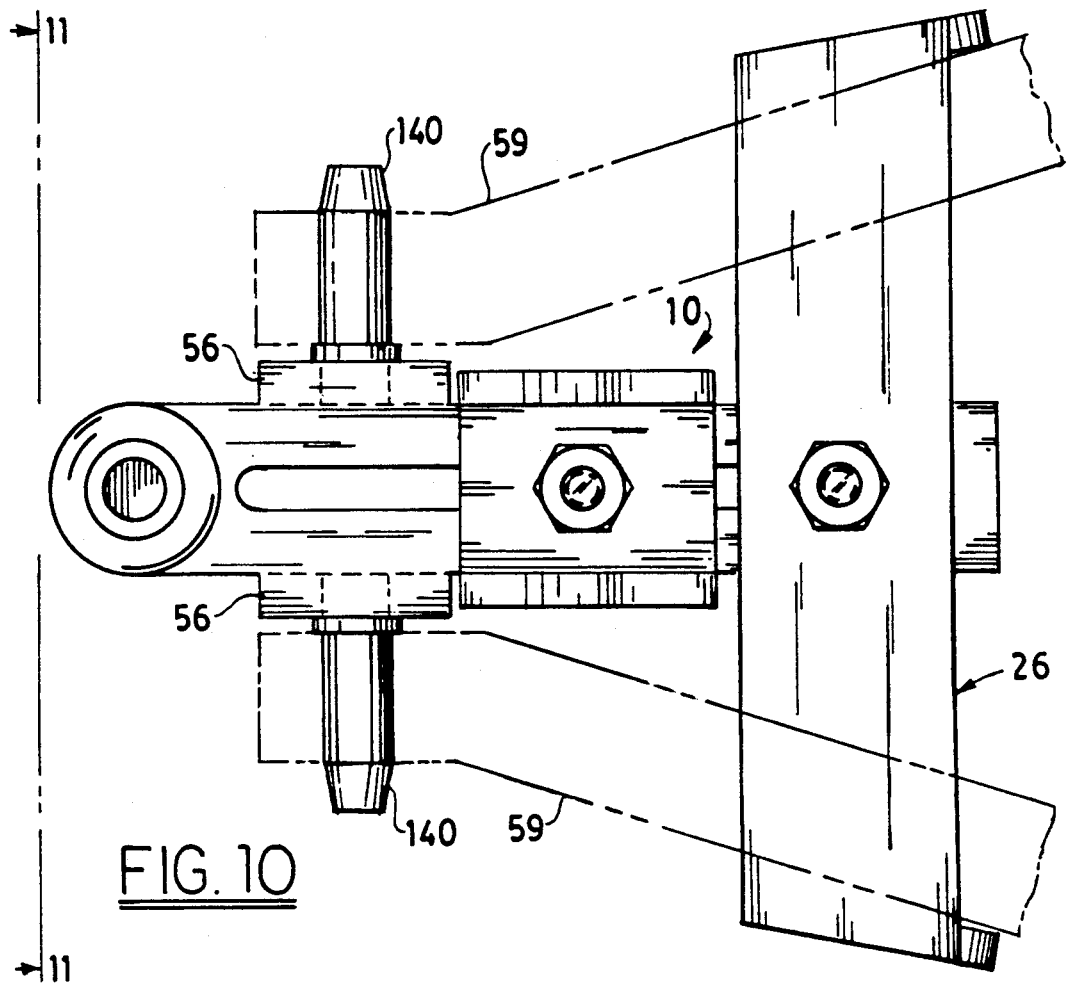
FIG. 10 is a top plan view of a modified coupling device made in accordance with the present invention.
Figure 11:
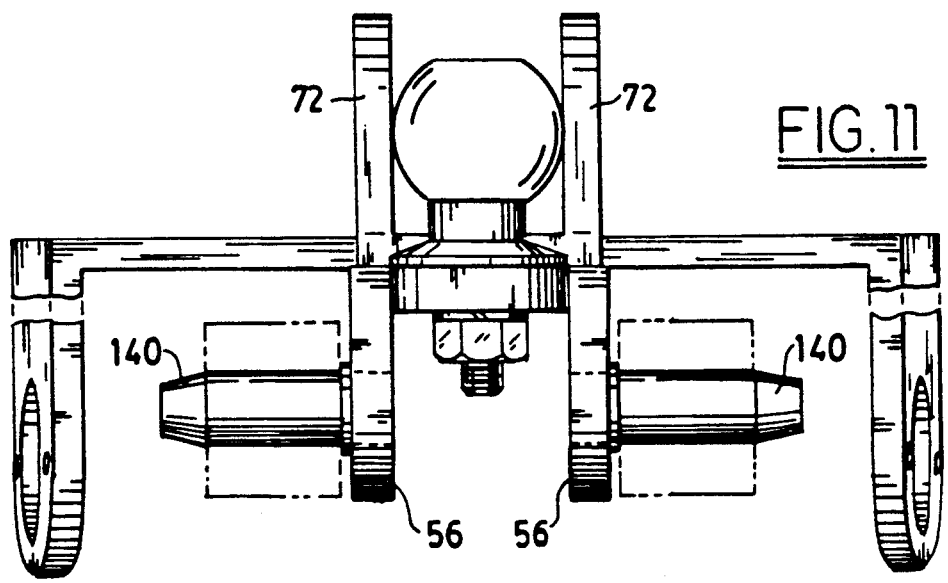
FIG. 11 is an end side elevational view of the coupling device of FIG. 10 as taken along line 11—11.

In the embodiment illustrated in FIGS. 10 and 11 there is illustrated modified means for securing the forward end of arms 59 to device 10, like numerals indicating like parts. In this particular embodiment, instead of using a pin 64 for securing the side arms 59 to the forward end 14 of support member 12, a pair of outwardly extending pins 140 secured to projections 50 are provided. The pins 140 are simply placed through the openings 62 in side arms 59. Since the projections 32 of cross support member 26 prevent any substantially axial movement of the side arms 59 there is no need to provide locking means to retain the forward end side arm 59 on pins 140 thereon.

Referring to FIGS. 12, 13 and 14, there is illustrated another modified embodiment of the coupling device 10, like numerals indicating like parts. In this embodiment, the projections 56 are also adjustable. In the embodiment illustrated in FIGS. 1-4, the forward projections 56 are an integral part of the main longitudinally extending support member 12. In this embodiment the projections 56 are made as a part of separate adapter 250 whereby the positioning of openings 58 in projections 56 may be varied. The adapter 251 is secured to support member 12 by a bolt 252 which passes through the longitudinally extending slot 54 in main support member 12 and is secured thereto in a similar fashion as adapter 66 and cross support member 28. In particular, a threaded bolt 90 passes through an opening 92 in the base 94 of adapter 251 and is secured to support member 12 by a threaded nut 97. As can be seen, the positioning of openings 58 in projections 56 may be adjusted as desired. Additionally, in this embodiment, a pin member 264 is provided for engagement with the opening 58 in side arms 59. Locking rings 233 are placed in grooves adjacent projections 56 to lock pin member 264 in position.

Additionally, in the embodiment of FIGS. 12, 13 and 14, the cross support member 28 instead of being made of a single integral piece comprises of two separate elements 228. The separate elements 228 are adjustable so as to accommodate any particular width between the arms 59. The two separate elements 228 each have an axially extending slot 230 as illustrated in FIG. 14. Bolt 53 is used to secure the cross member 28 to support member 12 is also used to allow individual elements 228 of cross support member to move in the axial direction as desired so as to capture side arms 59 therebetween. Guide pins 235 are provided at the end of each of the separate elements 228 and extend into the slot 230 to prevent the elements from twisting out of axial alignment. Once the nuts 55 are tightly secured, the elements 228 will be tightly secured in the desired position. In the particular embodiment illustrated one of the elements 228 is made of two individual elements 229, and 231 that are welded together in order to properly mate with the other element 228. However, the two piece element 228 may be made of a single piece that is bent to have the appropriate configuration.

In the preferred installation of coupling device 10, the coupling device 10 is placed on top of side arms 59. If desired, the device 10 may be inverted and placed underneath side arms so that the hitch ball is lower to the ground for easier installation on the trailing vehicle.

It is, of course, to be understood that various other modifications may be made without departing from the scope of the present invention, the present invention being defined by the following claims.

I claim:

1. A coupling device for converting a three-point hitch to either a ball or pin type hitch comprising:
   a main longitudinally extending support member having a forward end and a rearward end, said forward end having means for securing a ball or pin thereto and means for securing the forward ends of two side arms of a three-point hitch thereto;
   a locking member secured at the rear section of said main support member, said locking member comprising a cross support member which terminates in a pair of lateral spaced ends, said lateral spaced ends each having a projection extending therefrom in the same direction away from said cross support member, each of said projections having a hole, said holes in said projections being in axial alignment so as to receive a first locking pin therethrough, said projections each having a length such that when said device is mounted on two arms of a three-point hitch said first locking pin passes through said aligned holes in said projections so as to capture said two arms between said cross support member and said pin.

2. A coupling device according to claim 1 wherein said means for securing the forward ends of two side arms of a three-point hitch comprises a pair of oppositely extending pins designed so as to fit within opening provided at the forward ends of the two side arms of a three-point hitch.

3. A coupling device according to claim 1 wherein said means for securing the forward ends of the two side arms of a three-point hitch comprises of a pair of axially spaced projections extending from said main support, each of said projections having an axially aligned hole for receiving a second locking pin that is placed therethrough, said projections being positioned in said projection such that they are in axial alignment with the openings in the side arms of the three-point hitch so as to allow said second locking pin to pass through said holes in said projections and opening in the side arms of the three-point hitch.

4. A coupling device according to claim 3 wherein locking means are provided for retaining said second locking pin in position and preventing it from coming out of said holes in said projections and the opening in the side arms.

5. A device according to claim 4 wherein said locking means for retaining said second locking pin in position comprises a locking clip having a shaft which passes through an opening in said locking pin.

6. A coupling device according to claim 1 further comprising means for adjusting the position of said locking member along the longitudinal axis of said main longitudinally extending support member so as to accommodate the angle orientation of the two side arms of the three-point hitch.

7. A coupling device according to claim 6 wherein said means for adjusting the position of said locking member comprises a longitudinally extending slot in said main longitudinally extending support member which is designed to receive a threaded bolt passing therethrough, said bolt also passing through an opening in said locking member, a threaded nut is provided for engagement with said bolt and securing said locking member to said main longitudinally extending support member.

8. A coupling device according to claim 1 wherein said locking member is secured to said main longitudinally extending support member by a threaded bolt passing through an opening in said main longitudinally extending support member and an aligned opening in said locking member and a threaded nut which engages threads of said bolt.

9. A coupling device according to claim 1 further comprising of an adapter secured to said main longitudinally extending support member for allowing connection of the third arm of a three-point hitch.

10. A coupling device according to claim 1 further comprising means for adjusting the position of the holes in said side projection of said locking member.

11. A device according to the claim 10 wherein said means for adjusting the position of said holes in said side projections of said locking member comprises of a locking disk having a central cylindrical portion and an outer skirt portion, said central cylindrical portion being designed to fit within a receiving hole in said side projections, said hole for receiving said first locking pin is provided in said central cylindrical portion, said outer skirt portion having a pair of slots which extend in an arcuate path, a bolt is provided for passing through each of said slots so as secure said locking disk to said projection of said locking member and allow rotation of said disk such that said hole for receiving said pin opening is vertically displaced with respect to said locking member so as to adjust the distance between said hole for receiving said pin and said cross member.